Feb. 20, 1923.
C. J. DEWEY.
CONVERTIBLE PNEUMATIC MOTOR AND COMPRESSOR.
FILED APR. 18, 1921.
1,446,291.
3 SHEETS—SHEET 1.
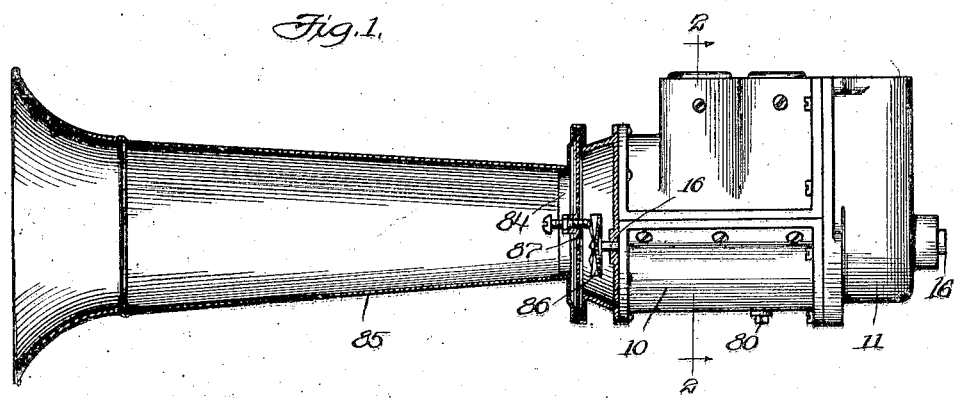
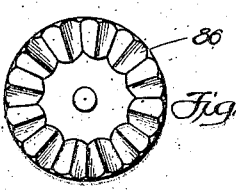
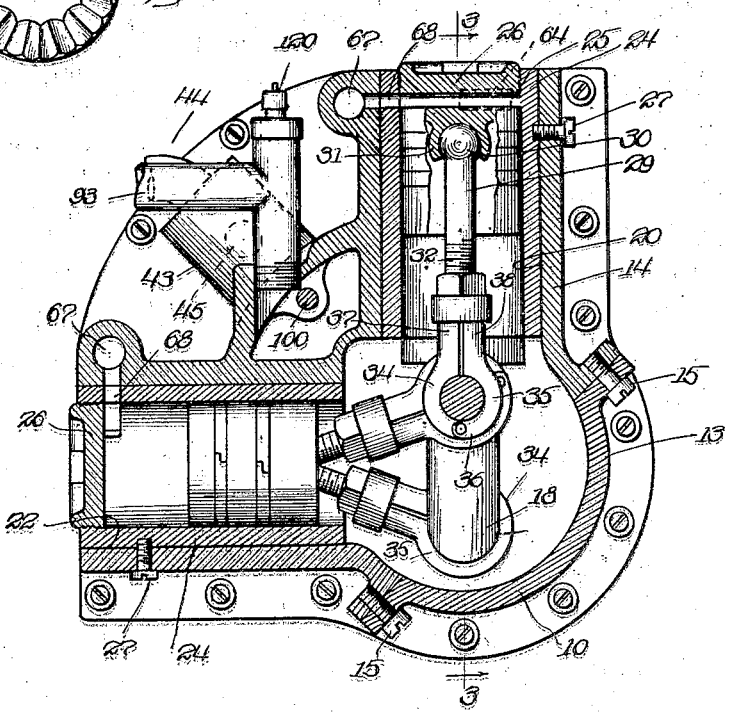
Inventor:
Charles J. Dewey
By Forée Bain Hinkle
Attys.

Feb. 20, 1923. 1,446,291.
C. J. DEWEY.
CONVERTIBLE PNEUMATIC MOTOR AND COMPRESSOR.
FILED APR. 18, 1921. 3 SHEETS—SHEET 2.
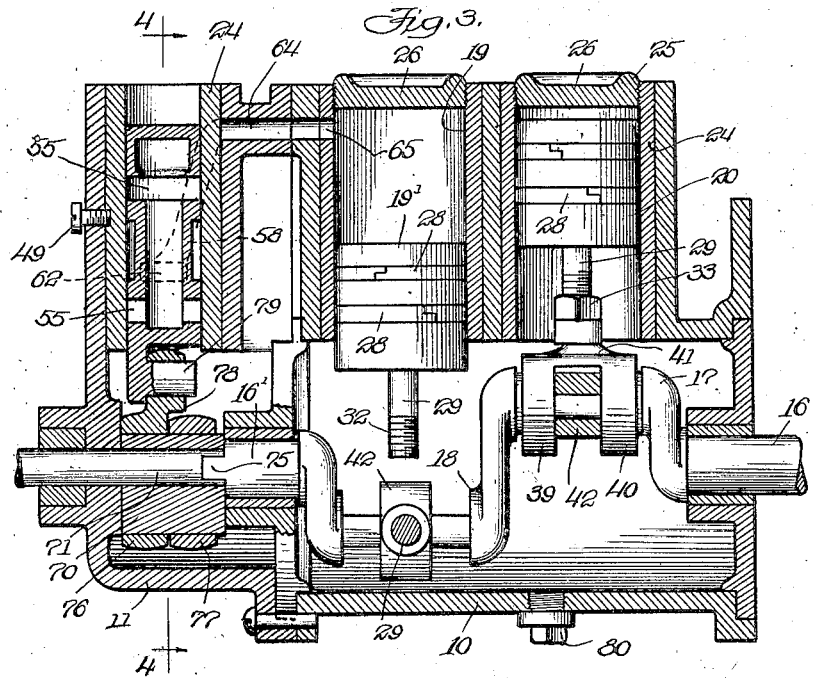
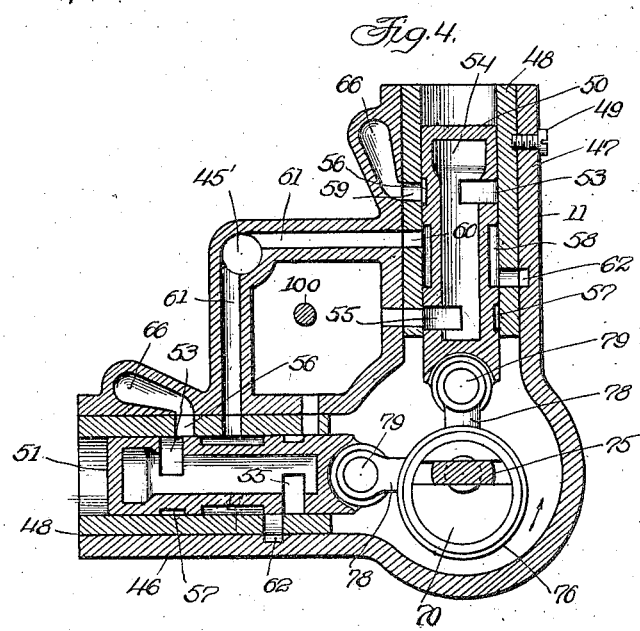
Inventor:
Charles J. Dewey
By Foree Bain & Hinkle
Attys

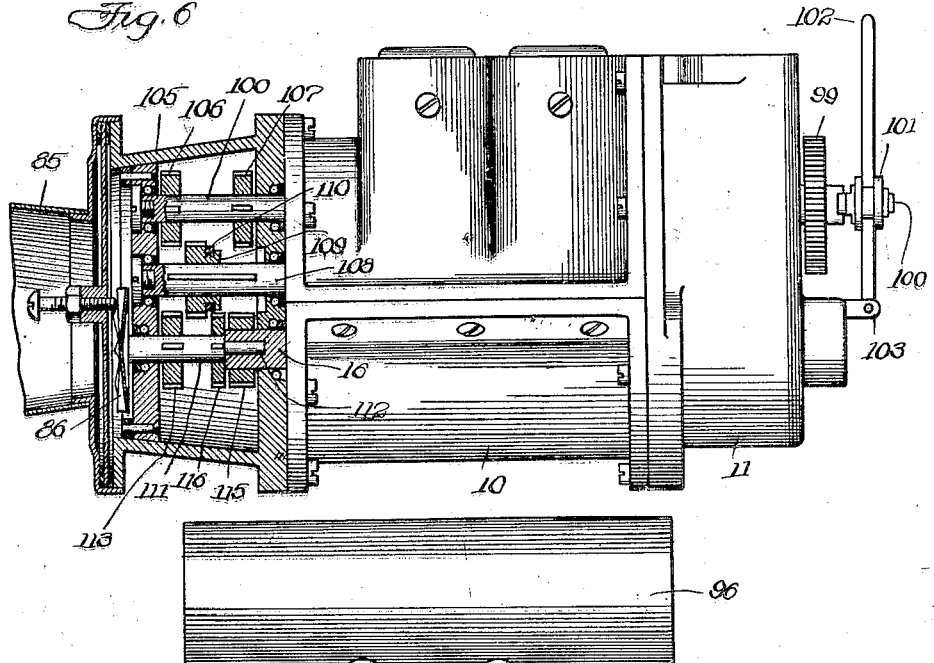
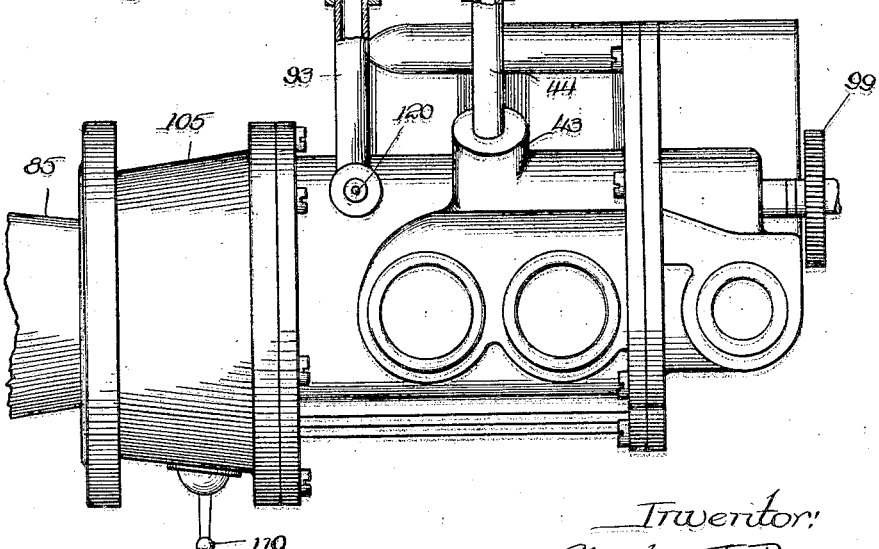

Patented Feb. 20, 1923.

1,446,291

UNITED STATES PATENT OFFICE.

CHARLES J. DEWEY, OF CHICAGO, ILLINOIS.

CONVERTIBLE PNEUMATIC MOTOR AND COMPRESSOR.

Application filed April 18, 1921. Serial No. 462,403.

*To all whom it may concern:*

Be it known that I, CHARLES J. DEWEY, a citizen of the United States, residing at Chicago, in the county of Cook and State of Illinois, have invented certain new and useful Improvements in Convertible Pneumatic Motors and Compressors, of which the following is a specification.

The invention relates to improvements in pneumatic motors and compressors.

One of the objects of the invention is to improve pneumatic motors and compressors.

Another object is to provide a piston propelled rotary motor that may conveniently and economically be operated by the exhaust gases from an internal combustion engine, or from a tank reservoir of any fluid under pressure.

Another object is to provide a motor, operable as described, which may be employed for operating a signal horn on an automobile, or for other purposes where power is required.

Another object is to provide a pneumatic motor which may be used as an air compressor when mechanically driven by a suitable source of power and which alternatively may be used upon an automobile for the purpose of inflating the tires.

Other, further and more specific objects of the invention will become readily apparent, to persons skilled in the art, from a consideration of the following description when taken in conjunction with the drawings, wherein;—

Fig. 1 shows the motor in side elevation connected to a mechanically operated horn.

Fig. 2 is an enlarged section taken on line 2—2 of Fig. 1.

Fig. 3 is a section taken on line 3—3 of Fig. 2.

Fig. 4 is a section taken on line 4—4 of Fig. 3.

Fig. 5 is an elevation of a corrugated disk used for vibrating the diaphragm of the horn.

Fig. 6 is an enlarged side elevation of the motor with a speed changing gear attached thereto and shown in section.

Fig. 7 is a plan view of the motor showing it connected to an air tank.

In all the views the same reference characters are employed to indicate similar parts.

The motor is contained practically and preferably in two parts, the crank casing 10 and the valve casing 11. The crank casing 10 may be divided in two parts, 13 and 14, so that the part 13 may be removed by taking out the screws 15 for access to the crank shaft and connecting rods. The crank shaft 16 is provided with two cranks 17 and 18.

There are four cylinders, radiating from the casing 10, associated in two pairs, 19, 20, 21 and 22. The cylinder 21 is parallel with the cylinder 22 and is in substantial alignment therewith and bears the same relation thereto as the cylinder 19 bears to the cylinder 20. Each of the cylinders is provided with a removable bushing 24 secured in place by the screw 27 which passes thru the walls of the cylinder into a suitable opening in the bushing. The bushings are each screwthreaded at its upper end, as at 25, and contains a screw threaded cylinder head 26 removably secured in each bushing. Each of the cylinders contains a reciprocative piston, the cylinders of a pair being indicated by the same numerals with the addition of the exponents prime ('), and each of the pistons is provided with two piston rings 28.

The connecting rods of all the pistons are alike and each connecting rod 29 is provided on one end with a ball 30 which is held in the socket 31, of the piston, so as to give the piston rod universal movement. The other end 32, of the piston rod, is threaded to receive a nut 33. One of the horizontal pistons and one of the vertical pistons, constituting a pair, are connected to the same crank arm, thus the crank arm 17 has one pair connected thereto, and the crank arm 18, the other pair of the four cylinders. The bearings for the crank shaft for connection to the connecting rods consist of two members 34 and 35 hinged together at 36, each having a threaded end 37 and 38, for inclusion within the nut 33. One of the connecting rods has two fork members 39 and 40 connected together, as at 41, the other connecting rod has a two-part bearing 42 that is included between the members 39 and 40, the two parts of the bearing are held together by means of the nut 33, as heretofore described.

When the device is used as a motor the air inlet for admitting air, or other fluid under pressure, consists of the hollow threaded boss 43, into which is secured a pipe 44 for conducting the fluid under pressure to the motor.

A lateral conduit 45 from the boss 43 communicates with an opening 45' in the valve casing 11, as more clearly shown in Fig. 4.

The valve casing 11 has two angularly related cylinders 46 and 47, each containing a bushing 48 held in the respective cylinders by screw 49, or otherwise. The bushings 48 are open at their outer ends. A hollow piston valve 50 controls the air for the two vertically disposed cylinders 19 and 20, while the piston valve 51 performs the same service for the horizontally disposed cylinders. The piston valves 50 and 51 are each hollow and are moved in timed relation with the pistons in the respective cylinders. The valve 50 has a port 53 near one end, cut into the interior 54, and another similar port 55, near the other end, also communicating with the interior of the piston valve. An annular groove 56 extends around the piston and communicates with port 53. A similar groove 57 communicates with the port 55. An intermediate longer groove 58 extends around the piston 50 and is adapted to communicate with the ports 59 and 60 made thru the bushings 48 of the cylinders.

When the device is used as a motor and when piston valve 50 is in position shown in Fig. 4, air under pressure will pass from pipe 90 or 97 thru valve 91 into pipe 44, thence thru conduits 45' and 61 into ports 60 and 58, thence thru port 62, channel 64 into cylinder 19. In the meantime air is being exhausted from cylinder 20 thru conduit 66, ports 59, 56 and 53 into the atmosphere. When piston valve moves upwardly, then cylinder 20 will receive air under pressure and cylinder 19 will exhaust thru the hollow piston valve, as described. Piston valve 51 performs the same service for cylinders 21 and 22 in proper timed relation.

In the present exemplification of the invention, the piston valves 50 and 51 are moved by an eccentric 70 that has bearing support on the reduced end 71 of the crank shaft.

The end 16' of the shaft 16 is provided with a flat part 75 that enters a transversely extending groove in the eccentric 70 and the end of the shaft 71 for the purpose of rotating the same, and so that the casing 11 may be removed conveniently from the casing 10. Each of the eccentrics is surrounded by an eccentric strap 76 and 77, respectively, each having an arm 78 to engage a pin 79 which is a part of the piston valves.

The crank case 10 and the valve case 11 may be partly filled with oil, for the purpose of lubricating the pistons, cylinders and the moving parts connected with the shaft, and a plug 80 may be screwed into the casing 10 thru which the oil from the two casings may be emptied.

The motor described may be used for vibrating a diaphragm 84 of the horn 85, or for any other purpose. In the horn a corrugated disk 86 is secured to the end of the shaft 16 and is caused to make rotating contact with a threaded pin 87 that extends thru the diaphragm 84.

The disk 86 may be rotated directly by the shaft 16 or it may be rotated by an intermediate train of gears, as hereinafter more fully described.

An air reservoir or tank 96 is connected to the pipe 44 thru a pipe 97 and the valve 91. It is also connected by pipe 98 thru the valve 94 to the pipe 93, so that either pipes 97 or 98 may be brought into connection with the motor by rotation of the valves 91 and 94.

When it is desirable to operate the motor from the air contained in the tank 96 the valve 91 may be rotated so as to close pipe 90, whereupon air will enter the motor thru the pipes 97 and 44 and be exhausted thru pipes 93 and 95, and when it is desired to compress air in the tank 96 by means of the motor compressor, valve 94 may be turned so as to close the pipe 95, whereupon when the motor is driven by power furnished from the automobile engine thru the gear 99, air to be compressed will be taken in thru the pipe 90 and pass thru the pipe 44 and into the device heretofore described, and will be exhausted into the air tank 96, thru the pipes 93 and 98, and pass the valve 94, in the manner to be readily understood.

The gear wheel 99 is connected to the shaft 100 by a clutch 101 operated by the lever 102, which is pivoted as at 103. This gear wheel may be driven by any suitable means from the engine. The shaft 100 passes thru the casings 10 and 11 into a gear changing casing 105. The shaft 100 carries gear wheels 106 and 107 in the casing 105.

An intermediate jack shaft 108 carries a shiftable gear 109 moved along the shaft 108 by means of the hand operated lever 110. Another shaft 111, having a bearing 112 in one end of the crank shaft 16, carries a gear wheel 113, and it also carries the corrugated disk 86. When the shifting gear wheel 109 is brought into mesh with the gears 106 and 113, the horn 85 will be operated by the power that drives the shaft 100. If the gear wheel 109 be now shifted on the shaft 108 until it is brought into mesh with the gear wheel 115, which is fastened to the crank shaft 16, then the compressor will be driven by the shaft 109 from power furnished by the engine of the automobile thru the gear wheel 99. If the gear wheel 109 be shifted until it is in mesh with the wheels 116 and 115, then when the exhaust gases from the engine are the means by which the motor is driven, the horn will be operated. When the gear wheel 109 is in the position shown in Fig. 6 then the horn will not be operated.

If the exhaust gases from the engine or if the fluid from the tank 96 is to be employed for operating the motor, then, of course, the clutch 101 will not connect the gear wheel 99, with the shaft 100, in which event the horn may be operated by means of the motor by having the gear wheel 109 connect the gears 115 and 116 together.

When it is desired to inflate the tires from the device a hose may be connected to the valve cap 120, and the motor mechanically driven by the automobile engine or air may be taken from the tank 96.

Having described my invention what I claim as new and desire to secure by Letters Patent, is:—

1. In a device of the character described a two-part casing; a cylinder; a lining for the cylinder; a threaded head in the lining; a shaft having a crank; a connecting rod connecting the crank and piston; a bearing divided into two hinged together parts and having two spaced apart bearing members surrounding the crank; a threaded nut to hold the two parts together and to secure them to the connecting rod and another similar bearing located on the crank between the two spaced-apart members for a piston rod connected to a piston having its axis disposed at an angle from the axis of the first mentioned piston.

2. A device of the character described comprising a crank casing; two pairs of cylinders extending therefrom, one pair angularly disposed with respect to the other pair; a valve casing separably connected to the crank casing; a pair of cylinders extending therefrom, one angularly disposed with respect to the other; a lining in each cylinder; a threaded head in each lining; a two-part crank shaft extending thru both casings and a connection between the two parts of said shafts arranged to become disconnected by movement of the two parts away from each other as when the casings are separated.

3. A device of the character described comprising a crank casing; two pairs of cylinders extending therefrom, one pair angularly disposed with respect to the other pair; a valve casing preferably connected to the crank casing; a pair of cylinders extending therefrom, one cylinder angularly disposed with respect to the other; a lining in each cylinder; a threaded head in each lining; a two-part crank shaft extending thru both casings, and a driving connection between the two parts of said shaft arranged to become disconnected by movement of the two parts, one away from the other, as when the casings are separated, and fluid conduits extending from the cylinders of one casing to the cylinders of the other casing brought into registering alignment when the casings are connected together.

4. A device of the character described comprising a cylinder; a crank shaft; a piston in the cylinder; a connecting rod connecting the crank and piston, in combination with a valve casing; a hollow piston valve therein, closed at both ends, said valve having ports extending from its periphery to the interior thereof, whereby to exhaust the first mentioned cylinder thru the ports of the hollow piston valve on the out stroke and to take in a fluid thru the piston on the in stroke, and means to move the valves and pistons in proper timed relation.

5. A device of the character described comprising a crank casing; a plurality of cylinders radiating therefrom; another plurality of similar cylinders radiating therefrom disposed at an angle from the first set of cylinders; a hollow hub projecting from the casing, between the aforesaid sets of cylinders to which to connect an intake pipe; a two way valve therein; a valve casing detachably connected to said crank casing; a cylinder radiating from the valve casing in axial alignment with each of the aforesaid cylinders; hollow piston valves closed at both ends in the cylinders of the valve casing; a crank shaft extending thru both casings; a conduit from the hollow hub to each of the valve cylinders and a conduit from each of the valve cylinders to one of the sets of cylinders; said piston valves having ports into their interior thru which the respective cylinders exhaust.

6. A device of the character described comprising a convertible pneumatic pump and a motor; a signal horn operable thereby; means to mechanically operate the horn without driving the motor and means to drive the motor without operating the horn.

In testimony whereof I hereunto subscribed my name.

CHARLES J. DEWEY.